United States Patent
Westphal (12)

(10) Patent No.: US 7,058,052 B2
(45) Date of Patent: Jun. 6, 2006

(54) SYSTEM AND METHOD FOR USING A MOBILE ROUTER TUNNELING PROTOCOL TO LOCATE FUNCTIONALITY IN A DISTRIBUTED ARCHITECTURE

(75) Inventor: Cedric Westphal, San Francisco, CA (US)

(73) Assignee: Nokia Corporation, Espoo (FI)

( * ) Notice: Subject to any disclaimer, the term of this patent is extended or adjusted under 35 U.S.C. 154(b) by 116 days.

(21) Appl. No.: 10/412,536

(22) Filed: Apr. 11, 2003

(65) Prior Publication Data

US 2004/0202160 A1 Oct. 14, 2004

(51) Int. Cl.
*H04L 12/56* (2006.01)

(52) U.S. Cl. .................. 370/389; 370/231; 370/235

(58) Field of Classification Search ........ 370/352–356, 370/389–393, 395.5–395.54, 400–401
See application file for complete search history.

(56) References Cited

U.S. PATENT DOCUMENTS

| | | | | |
|---|---|---|---|---|
| 6,385,179 B1 * | 5/2002 | Malcolm et al. | ............ | 370/329 |
| 6,400,681 B1 * | 6/2002 | Bertin et al. | ................ | 370/218 |
| 2003/0026225 A1 * | 2/2003 | Ogino et al. | ................ | 370/335 |

OTHER PUBLICATIONS

Kim, J.H.; Leung, K.; Echols, K.; Shell, D.; Denny, M.; "Demonstration of static network mobile router for mobile platforms"; Military Communications Conference, 2001. MILCOM 2001, IEEE , vol.: 2 , Oct. 28-31, 2001; pp. 746-750.*

Hsu, Yuan-Ying and Tseng, Chien-Chao; "A hierarchical proxy architecture with load-based scheduling scheme to support network mobility"; Parallel Processing Workshops, 2003. Proceedings. International Conference on Oct. 6-9, 2003, pp. 13-20.*

Stewart, D.H.; Ivancic, W.D.; Bell, T.L.; Kachmar, B.A.; Shell, D.; Leung, K.;"Application of mobile router to military communications";Military Communications Conference, Oct. 28-31, 2001, IEEE, pp., 388-396 vol. 1.*

"Network Mobility (nemo) Charter"; Last Modified Feb. 20, 2003; 3 pages. URL: http://www.ietf.org/html.charters/nemo-charter.html.

Ernst, et al.; "Network Mobility Support Requirements"; NEMO Working Group Internet-Draft; Feb. 2003; 12 pages. URL: http://www.ietf.org/internet-drafts/draft-ietf-nemo-requirements-00.txt.

* cited by examiner

*Primary Examiner*—Hanh Nguyen
*Assistant Examiner*—Thai Hoang
(74) *Attorney, Agent, or Firm*—Squire, Sanders & Dempsey LLP

(57) ABSTRACT

The system and method provides virtual mobility to an application by using a mobile router tunneling protocol (MRTP). The system and method use a MRTP to enable bi-directional tunneling between gateways so as to facilitate processing at a second network cluster in a way that is transparent to the user.

31 Claims, 3 Drawing Sheets

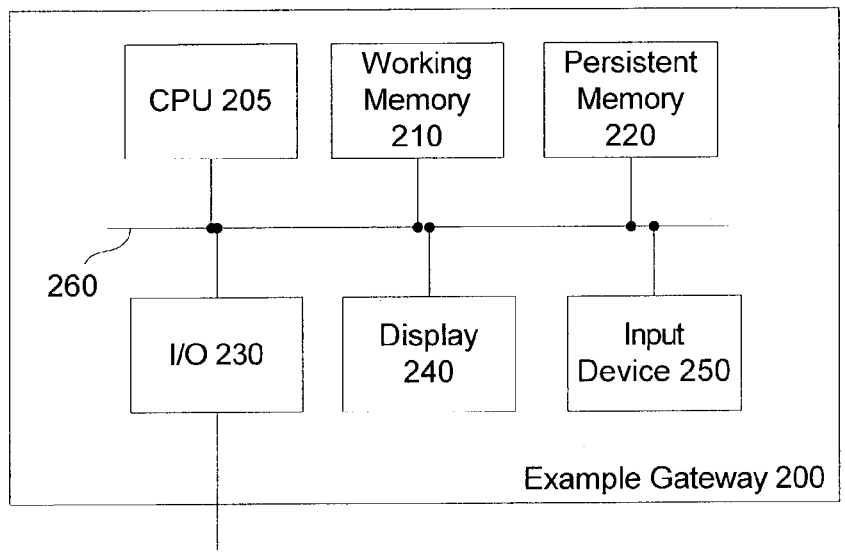
FIG. 2
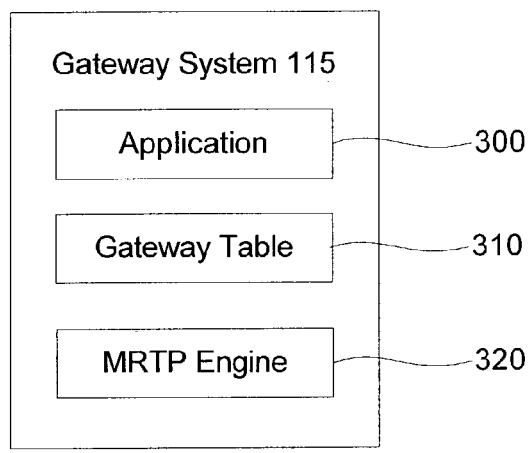
FIG. 3
| Network | Corresponding Network(s) |
|---|---|
| 147 | 150 |
| 120 | 150, 185 |
FIG. 4

SYSTEM AND METHOD FOR USING A MOBILE ROUTER TUNNELING PROTOCOL TO LOCATE FUNCTIONALITY IN A DISTRIBUTED ARCHITECTURE

TECHNICAL FIELD

This invention relates generally to networks, and more particularly but not exclusively, provides a system and method for locating functionality using a mobile router tunneling protocol (MRTP).

BACKGROUND

Networks, such as local area networks (i.e., LANs) and wide area networks (i.e., WANs, e.g., the Internet), enable a plurality of nodes to communicate with each other. Nodes can include computers, servers, storage devices, mobile devices, PDAs, wireless telephones, etc. Networks can include the nodes themselves, a connecting medium (wired, wireless and/or a combination of wired and wireless), and network switching systems such as routers, hubs and/or switches.

Recently, users and networks have become mobile. For example, aircraft now have local area networks (LANs) that are communicatively coupled to the Internet via access points (e.g., Connexion by Boeing$^{SM}$). As an aircraft moves, the mobile local area network accesses the Internet via different access points. Since the mobile LAN can change its point of attachment to the Internet, its reachability remains unchanged.

Due to the mobility of computer devices and networks, new protocols have evolved to accommodate this mobility. For example, mobile IP enables the forwarding of traffic to mobile users. Mobile IP uses a home agent at a home network and remote agents in remote networks. When a user accesses a remote network, a remote agent notifies the home agent, which then forwards traffic to the user at the remote network.

The Internet Engineering Task Force (IETF) currently has a working group developing a network mobility (NEMO) standard for mobile networks, i.e., a MRTP. The IETF NEMO document entitled "Network Mobility Support Requirements" is hereby incorporated by reference and referred to hereinafter as the NEMO document. In contrast to Mobile IP, NEMO will provide continuous network connectivity not only to a mobile router (also referred to interchangeably as a gateway) but also to the nodes behind the router, thereby preserving the networking topology as the mobile network moves. The NEMO document proposes that each mobile network have a mobile router that maintains a bi-directional tunnel between the mobile router and a corresponding home agent. All traffic is directed to the home agent, which then forwards the traffic to the mobile network's current access point via the bi-directional tunnel. Similarly, all traffic sent by the mobile network is directed to the Internet via the home agent via the bi-directional tunnel.

SUMMARY

A system and method provides access to different locations by an application by using a mobile router tunneling protocol. In one embodiment, the system includes a gateway data structure; a MRTP engine; and an application. The gateway data structure is capable of listing corresponding gateway data. The MRTP engine, which is communicatively coupled to the gateway data structure, is capable of determining a corresponding network cluster. In addition, the MRTP engine is capable of establishing a bi-directional tunnel, using a mobile router tunneling protocol, between the corresponding network cluster and the originating gateway. The application, which is communicatively coupled to the engine, is capable of invoking the engine.

In one embodiment, the method is executed in an originating gateway and comprises receiving a trigger; determining a corresponding network cluster; and establishing a bi-directional tunnel, using a mobile router tunneling protocol, between the corresponding network cluster and the originating gateway.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 2 is a block diagram illustrating an example gateway in accordance with the present invention;

FIG. 3 is a block diagram illustrating a gateway system of FIG. 1;

FIG. 4 is a diagram illustrating an example gateway table; and

DETAILED DESCRIPTION OF THE ILLUSTRATED EMBODIMENTS

The following description is provided to enable any person having ordinary skill in the art to make and use the invention, and is provided in the context of a particular application and its requirements. Various modifications to the embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Figure 1:
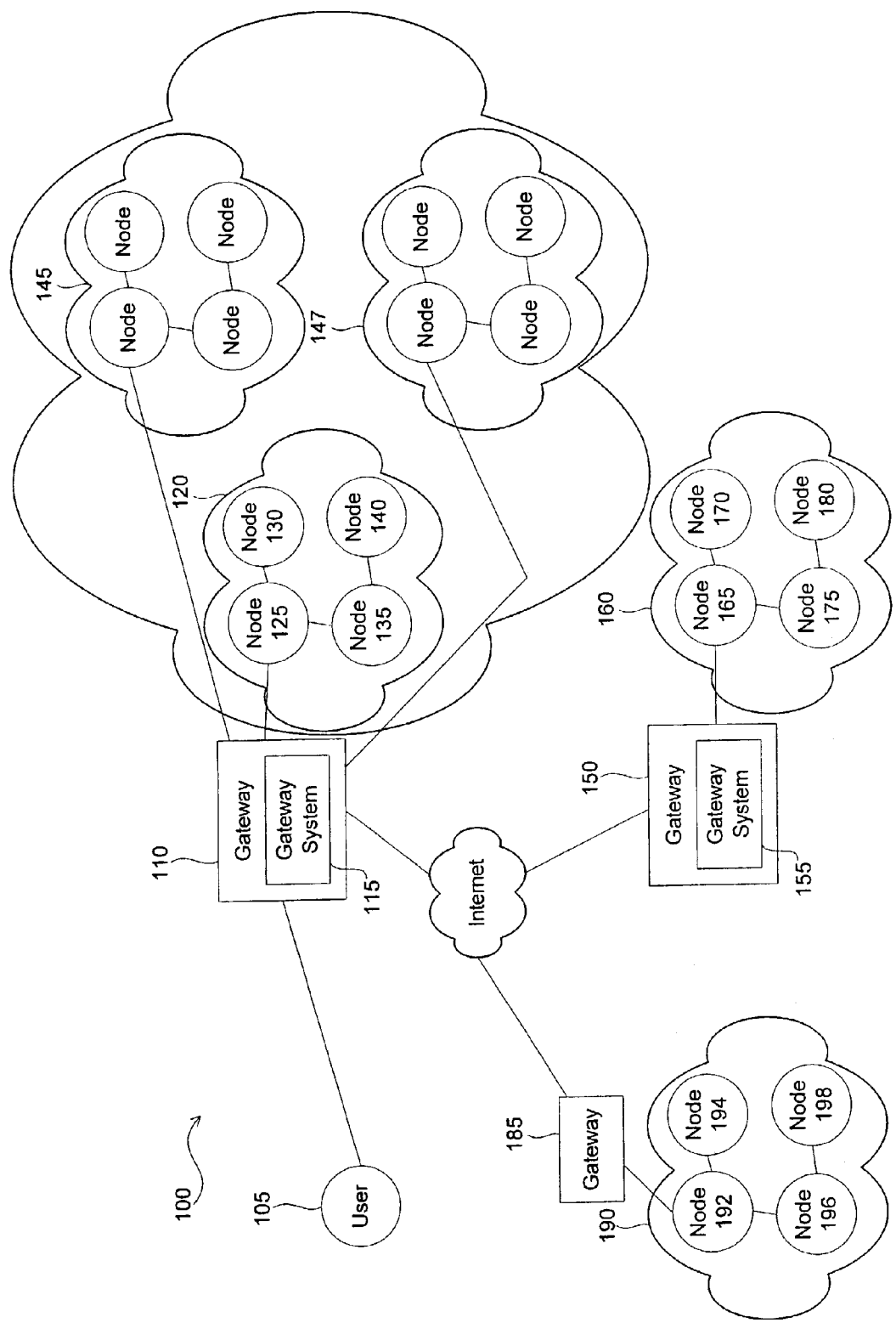
FIG. 1 is a block diagram illustrating a network system in accordance with an embodiment of the present invention.

FIG. 1 is a block diagram illustrating a network system 100 in accordance with an embodiment of the present invention. The network system 100 includes a user 105 communicatively coupled to a gateway 110, which is communicatively coupled to network clusters 120, 145, and 147; a gateway 150 communicatively coupled between the gateway 110, via the Internet, and a network cluster 160; and a gateway 185 communicatively coupled between the gateway 110, via the Internet, and a network cluster 190. One of ordinary skill in the art will recognize that the network system 100 can include additional or fewer network clusters and/or gateways.

The user 105 may include any type of computing device capable of communicating with the gateway 110. For example, the user 105 can include a PDA, wireless phone, laptop computer, desktop computer, etc.

The gateway 110 includes a gateway system 115, which will be described in further detail in conjunction with FIG. 3 below. The gateway 110 generally acts to route traffic between network clusters and will be described in further detail in conjunction with FIG. 2 below. In an embodiment of the invention, the gateways 150 and 185 can be substantially similar to the gateway 110.

The network cluster 120 includes four nodes: a node 125, a node 130, a node 135, and a node 140. As shown, the nodes 125, 130, 135, and 140 are communicatively coupled to the gateway 110 and can be arranged in various other topologies, such as a star topology or a ring topology, etc. The nodes 125, 130, 135, 140 can include servers running applications. One of ordinary skill in the art will recognize that the network cluster 120 can include fewer or additional nodes. In an embodiment of the invention, the network clusters 160 and 190 can be substantially similar to the network cluster 120. In another embodiment of the invention, the network cluster 120 only exists as a virtual network, which is used to address the functionality requested and to forward a request to an actual location of the node using the an actual address of the node instead of a virtual address.

The network cluster 160, as shown, includes four nodes: a node 165, a node 170, a node 175, and a node 180. The nodes in the network cluster 160 each have different IP addresses but share the same home address prefix. The nodes 165, 170, 175, and 180 are communicatively coupled to the gateway 150, and are arranged, in this instance, in an identical topology as the nodes of the network cluster 120. Alternatively, the nodes of the network cluster 160 can be arranged in various other topologies, such as a star topology or a ring topology, etc. An identical topology between corresponding network clusters is not required as long as each node connectivity to its cluster gateway is preserved. The nodes 165, 170, 175, and 180 include servers running applications that are substantially similar or preferably identical to the applications run by the nodes 125, 130, 135, 140. One of ordinary skill in the art will recognize that the network cluster 160 and/or 190 can include fewer (e.g., one) or additional nodes.

During operation of the system 100, the gateway system 115 will receive a request from the user 105 to access a service in the network cluster 120. Based on a load balancing analysis or other purpose, the gateway system 115 can either route the request to the appropriate node in the network cluster 120 or establish a bi-directional tunnel to the gateway system 155 using a MRTP, such as the protocol being developed by the NEMO working group. The gateway system 155 will then receive the request and forward it to the appropriate service in the network cluster 160. Traffic between the user 105 and the node in the network cluster 160 will then flow between the user 105 and a node the network cluster 160 via the gateways 110 and 150.

By using a MRTP to route traffic, the routing is transparent to the user 105, doesn't require re-authentication of the user as in conventional systems, and requires less maintenance than conventional methods. For example, using a conventional method would require the interception of packets at the gateway 110 and to do encapsulation on certain streams to the end node, e.g., the node 170. Alternatively, the stream could be encapsulated until reaching the gateway 150 and then perform network address translation (NAT). In the reverse direction, each node in the network cluster 150 would have to be encapsulated back to the gateway 110, or traffic might use direct routing, which could lead to dropped packets since the source of the packets, as identified in the packet header, is not expected by the user 105. For example, if the node 170 replies directly to the user 105, the user 105 might ignore the node 170 packets as the user 105 hasn't had any security relationship with the node 170. Accordingly, the user 105 would drop any packets received from the node 170.

FIG. 2 is a block diagram illustrating an example gateway, e.g., gateway 110, in accordance with an embodiment of the present invention. Each of the gateways 110, 150, and 185 may include or be resident on a gateway that is substantially similar to the example gateway 200.

The example gateway 200 includes a central processing unit (CPU) 205; working memory 210; persistent memory 220; input/output (I/O) interface 230; display 240 and input device 250, all communicatively coupled to each other via a bus 260. The CPU 205 may include an Intel Pentium® microprocessor, a Motorola PowerPC® microprocessor, or any other processor capable to execute software stored in the persistent memory 220. The working memory 210 may include random access memory (RAM) or any other type of read/write memory devices or combination of memory devices. The persistent memory 220 may include a hard drive, read only memory (ROM) or any other type of memory device or combination of memory devices that can retain data after example the gateway 200 is shut off. The I/O interface 230 is communicatively coupled, via wired and/or wireless techniques, to other gateways, network clusters and users. The display 240 may include a cathode ray tube display or other display device. The input device 250 may-include a keyboard, mouse, or other device for inputting data, or a combination of devices for inputting data.

One skilled in the art will recognize that the example gateway 200 may also include additional devices, such as network connections, additional memory, additional processors, LANs, input/output lines for transferring information across a hardware channel, the Internet or an intranet, etc. One skilled in the art will also recognize that the programs and data may be received by and stored in the system in alternative ways.

FIG. 3 is a block diagram illustrating a gateway system 115 (FIG. 1). In one embodiment of the invention, the gateway system 115 resides in the persistent memory 220 and is loaded into working memory 210. The gateway system 115 comprises a triggering application 300; a gateway table 310; and a MRTP engine 320. The application 300 triggers the MRTP engine 320 to establish a bi-directional tunnel between gateways when certain conditions, depending on the embodiment, are met. For example, the gateway system 115 can be used in a load-balancing embodiment to transfer processing from a first network to a second network using a MRTP in a way that is transparent to the user 105 and does not require the user 105 to be re-authenticated when being transferred to the second network cluster, thereby saving time and bandwidth and increasing convenience for the user.

In a load-balancing embodiment example, the application 300 triggers the MRTP engine 320 when a node in the network cluster 120 is processing more than a set number of processes or is otherwise congested. For instance, if the user 105 makes a request for a service of the network cluster 120 and the node in the cluster 120 providing the service, e.g., the node 125, is carrying a heavy load or is otherwise congested, then the application 300, based on measurements it takes, will trigger the MRTP engine 320. The MRTP engine 320 will establish a bi-directional tunnel between the gateway 110 and the gateway 150 using a MRTP, such as the protocol being developed by the NEMO working group, as will be discussed further below. The tunneling is transparent to the user 105 and does not require re-authentication of the user 105 or encapsulation of packets.

In another embodiment of the invention, the application 300 of the gateway system 115 can trigger the MRTP engine 320 when needing to switch between networks to use different services. For example, the application 300 of the gateway system 115 can act as an authentication engine to perform user authentication and to filter traffic to service providers. The application 300 can enable access to a first service, such as an e-commerce shopping service, at a first network cluster, e.g., the network cluster 120, and then invoke the MRTP engine 320 to tunnel to a second gateway for accessing a second service, such as credit card processing. By using the MRTP engine 320 to tunnel between gateways, the switching between services at different network clusters is transparent to the user 1 05 and does not require the re-authentication of the user 105.

The gateway table 310, as will be discussed in further detail in conjunction with FIG. 4, holds data indicating which gateways correspond with which networks. For example, the network 147 corresponds with the gateway 150 while the network 120 corresponds with the gateways 150 and 185. Accordingly, the MRTP engine 320 of the gateway 110 will tunnel to either the gateway 150 or 185 when invoked by the application 300. It will be appreciated by one of ordinary skill in the art that the gateway table 310 can take the form of any data structure, and that the gateway table 310 is displayed as a table for simplicity and convenience.

The MRTP engine 320 of a first gateway (e.g., the gateway 110), when invoked by the application 300, looks up a corresponding network cluster in the gateway table 310 and establishes a bi-directional tunnel between itself and a corresponding network (e.g. the network 190) using a MRTP, preferably according to the standard being developed by NEMO working group. One of ordinary skill in the art will recognize that other standards or non-standards may be used (e.g., Connexion by Boeing). The MRTP engine 320 then routes traffic to and from the corresponding network cluster (e.g., the network 190) via the first gateway (e.g., the gateway 110) as if the first network cluster (e.g., network cluster 120) moved to the physical location of the second network cluster (e.g., network cluster 160).

The MRTP engine 320 performs this tunneling at a layer 3 level, i.e., the communications layer that uses logical addresses of clients and/or servers in a network. More specifically, the layer 3 level includes a protocol that converts IP addresses into MAC addresses and also fragments packets according to frame size if required. However, the MRTP engine 320 may also need to perform some processes at a higher layer. For example, in an alternative embodiment of the invention, the MRTP engine 320 can perform route optimization and therefore may need to perform a topography lookup. For instance, after tunneling to a gateway, the MRTP engine 320 can have traffic travel directly between the user 105 and the second gateway (instead of through the first gateway), if the second gateway is geographically closer to the user 105 than to the first gateway.

In another embodiment requiring processing above layer 3, several nodes in a network cluster may each provide different applications but share the same IP address. A corresponding gateway would need to resolve which application (e.g., which node) is being addressed and thus to which node to route traffic to.

In a load-balancing embodiment, the MRTP engine 320 may also contact (e.g., background signal) another gateway before establishing a bi-directional tunnel. For example, the MRTP engine 320 may contact a corresponding gateway as indicated in the gateway table 310 (to be discussed further below) to determine its current load. For instance, if the MRTP engine 320 of the gateway 110 wants to transfer the user 105 request to the network cluster 160, the MRTP engine 320 may first determine the load on the network cluster 160 by inquiring of the gateway system 155 first. If the network cluster 160 is carrying a heavier load than the network cluster 120 or a load that exceeds a fixed threshold, then the MRTP engine 320 need not establish a bi-directional tunnel to transfer the user 105 request from the network cluster 120 to the network cluster 160.

The MRTP engine 320 in a corresponding gateway (e.g., in the gateway 150) works with the MRTP engine 320 in the originating gateway (e.g., the gateway 110) to establish a bi-directional tunnel under a MRTP. It will be appreciated by one of ordinary skill in the art that the MRTP engine 320 can use other protocols besides the standard being developed by the NEMO working group to enable mobile router tunneling.

FIG. 4 is a diagram illustrating an example gateway table 310. The gateway table 310 can be in the format of any data structure and is shown as a table in this embodiment for convenience and simplicity. The gateway table 310 holds information indicating which gateways correspond with which networks. For example, the network 147 corresponds with the gateway 150 while the network 120 corresponds with the gateways 150 and 185. The MRTP engine 320 uses the gateway table 310 to determine which gateway to tunnel to when invoked by the application 300. A corresponding gateway can be linked a network cluster substantially similar to the originating gateway or can be linked to a network cluster that offers different applications. For example, the originating gateway can be linked to a network cluster for e-commerce shopping applications, and the corresponding gateway can be linked to a network cluster for e-commerce credit card processing applications.

In another embodiment of the invention, the gateway table 310 or an additional data structure (not shown) can include topography data that indicates the geographical location of corresponding gateways or the distance between the corresponding gateway and the user in terms of some network metric (round-trip delay for instance or spatial coordinates). Accordingly, if route optimization is enabled, the MRTP engine 320 can select a corresponding gateway that is closest (geographically or in terms of the performance metric used) to the user 105 and bypass the originating gateway by establishing a tunnel between the user 105 and the corresponding gateway, thereby enabling more direct communication with the user 105. Alternatively, if there is a plurality of corresponding gateways, the geographical data can be used to select a gateway to tunnel to that is closest to the originating gateway.

Figure 5:
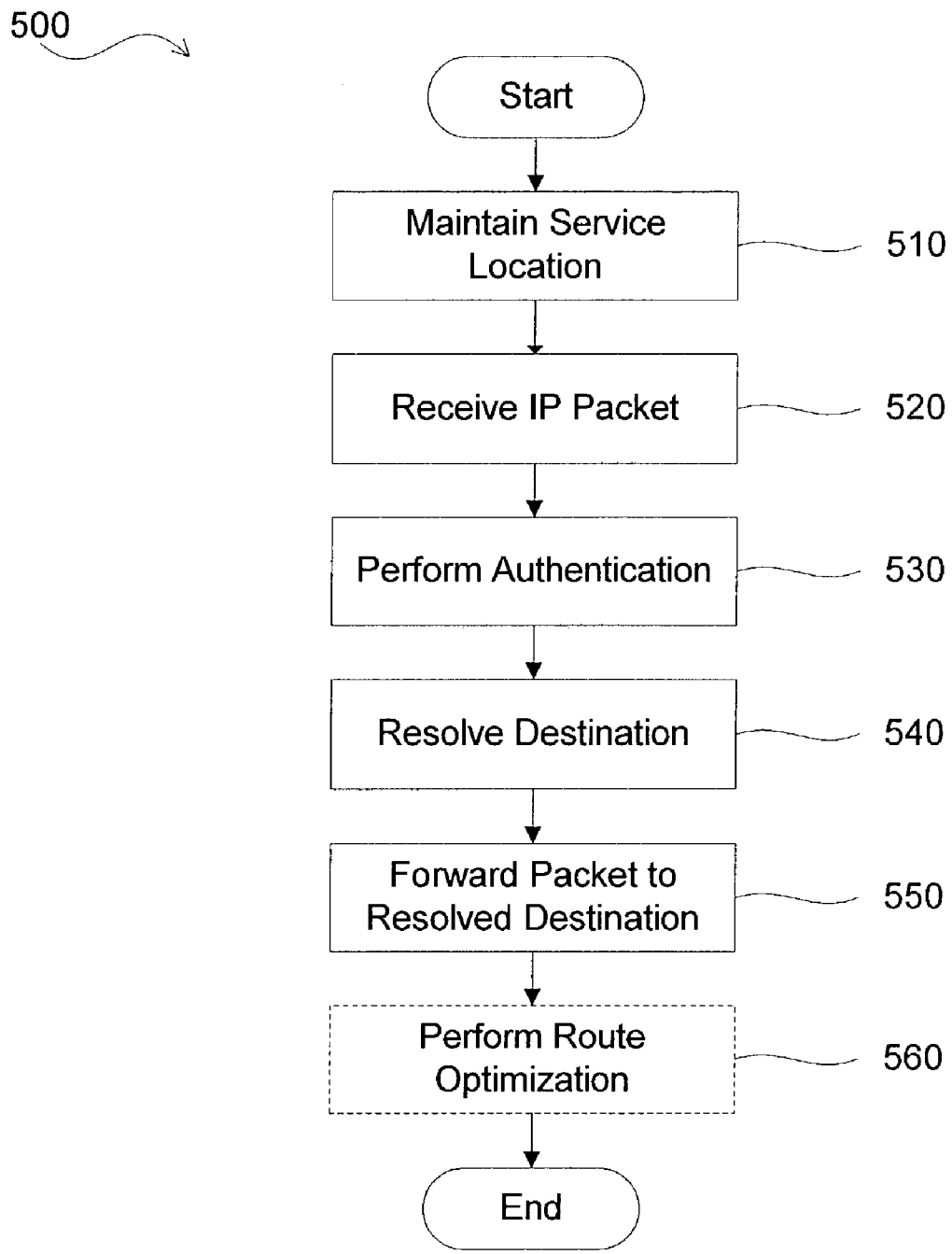
FIG. 5 is a flowchart illustrating a method for using a MRTP in static situations.

FIG. 5 is a flowchart illustrating a method 500 for using a MRTP in static situations (e.g., with non-mobile networks). In an embodiment of the invention, the MRTP engine 320 executes the method 500. Further, the MRTP engine 320 can run a plurality of instances of method 500 substantially simultaneously. First, a trigger is received (510) from the application 300. The application 300 invokes or triggers the MRTP engine 320 whenever a predetermined circumstance or set of circumstances occurs. For example, in a load balancing embodiment, the application 300 can trigger the MRTP engine 320 whenever a node is determined to be carrying a greater than pre-specified load or whenever a node is otherwise congested. In another embodiment, the application 300 triggers the MRTP engine 320 when needing to switch between network clusters to use different applications (e.g., an e-commerce shopping application and an e-commerce credit card processing application).

First, a service location is maintained (510). The maintaining (510) includes establishing a bi-directional tunnel to a corresponding network when triggered by the engine 320.

The bi-direction tunnel can be established per the MRTP standard being developed by the NEMO working group or via other MRTPs. For example, the gateway 110 can establish a tunnel to the network 190 when the network 120 is congested. The determination of which network to tunnel to can be based on data read from the gateway table 310 or other data structure. If there are a plurality of corresponding networks, the determination can also be based on the geographical location of the corresponding network (e.g., select which network is closest). The geographical determination can be made by looking up a topography data structure that indicates the locations of gateways. Alternatively, the gateway table 310 can also include topography data for each gateway.

After the maintaining (510), which can be done on a continuous basis, an IP packet is received (520) from the user 105. Authentication can then be performed (530), if necessary (e.g., for new flows). In addition, firewall rules can be update is necessary. Next, the destination of the packet can be resolved (540) at a layer 3 level. This includes examining the IP address and determining what is the packet's destination network based on the IP address prefix. As the destination network has "moved," the packet is then forwarded (550) to the resolved destination via the bi-directional tunnel. After the forwarding (550), route optimization can be performed (560) if implemented in the MRTP. The route optimization enables communication between the user 105 and a corresponding gateway without going through the originating gateway. The method 500 then ends.

The foregoing description of the illustrated embodiments of the present invention is by way of example only, and other variations and modifications of the above-described embodiments and methods are possible in light of the foregoing teaching. For example, the invention can be implemented using any mobile network protocol in place of the standard described in the NEMO document. Components of this invention may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

What is claimed is:

1. A method performed in an originating gateway communicatively coupled to a first network cluster, comprising:
    invoking a trigger by an application in the originating gateway when at least one predetermined circumstance occurs;
    upon receipt of the trigger, maintaining a service location in a fixed network environment using a bi-directional tunnel to a second network cluster according to a mobile router tunneling protocol;
    receiving a packet addressed in the first network cluster;
    resolving a new destination in the second network cluster of the received packet based on the maintaining; and
    forwarding the packet to the resolved destination in a manner that is transparent to a sender of the packet and that does not require further authentication of the sender or encapsulation of the packet.

2. The method of claim 1, further comprising performing route optimization.

3. The method of claim 1, wherein the maintaining is based on load balancing analysis.

4. The method of claim 3, further comprising communicating with the corresponding gateway to determine if a load in the second network cluster exceeds a fixed threshold.

5. The method of claim 3, further comprising communicating with the corresponding gateway to determine if a load in the second network cluster exceeds a load in the first network cluster.

6. The method of claim 1, wherein the maintaining is based on the distance between an origin of the received packet and the second network cluster.

7. The method of claim 6, wherein the distance is measured in terms of space coordinates.

8. The method of claim 6, wherein the distance is measured in terms of delays.

9. The method of claim 1, wherein the first network cluster runs a first service and the second network cluster runs a second service.

10. The method of claim 1, wherein the mobile router tunneling protocol includes the NEMO standardized protocol.

11. A computer-readable medium having stored thereon instructions to cause an originating gateway, communicatively coupled to a first network cluster, to execute a method, the method comprising:
    invoking a trigger by an application in the originating gateway when at least one predetermined circumstance occurs;
    upon receipt of the trigger, maintaining a service location in a fixed network environment using a bi-directional tunnel to a second network cluster according to a mobile router tunneling protocol;
    receiving a packet addressed in the first network cluster;
    resolving a new destination in the second network cluster of the received packet based on the maintaining; and
    forwarding the packet to the resolved destination in a manner that is transparent to a sender of the packet and that does not require further authentication of the sender or encapsulation of the packet.

12. The computer-readable medium of claim 11, wherein the method further comprises performing route optimization.

13. The computer-readable medium of claim 11, wherein the maintaining is based on load balancing analysis.

14. The computer-readable medium of claim 13, wherein the method further comprises communicating with the corresponding gateway to determine if a load in the second network cluster exceeds a fixed threshold.

15. The computer-readable medium of claim 13, wherein the method further comprises communicating with the corresponding gateway to determine if a load in the second network cluster exceeds a load in the first network cluster.

16. The computer-readable medium of claim 11, wherein the maintaining is based on the distance between an origin of the received packet and the second network cluster.

17. The computer-readable medium of claim 16, wherein the distance is measured in terms of space coordinates.

18. The computer-readable medium of claim 16, wherein the distance is measured in terms of delays.

19. The computer-readable medium of claim 11, wherein the first network cluster runs a first service and the second network cluster runs a second service.

20. The computer-readable medium of claim 11, wherein the mobile router tunneling protocol includes the NEMO standardized protocol.

21. A gateway system in an originating gateway communicatively coupled to a first network cluster, comprising:
    a gateway data structure capable of listing corresponding network cluster data;

an application for invoking a trigger in the originating gateway when at least one predetermined circumstance occurs; and a mobile router tunneling protocol engine, communicatively coupled to the gateway data structure and the application, capable of receiving a packet, capable of using the gateway data structure to determine a second network cluster in a fixed network environment that corresponds with the first network cluster and capable of using a mobile router tunneling protocol to establish a bi-directional tunnel between the second network cluster and the originating gateway wherein upon receipt of the trigger, the mobile router tunneling protocol engine maintains a service location using the bi-directional tunnel to the second network cluster according to a mobile router tunneling protocol, resolves a new destination of a received packet based on the maintained service location and forwards the packet to the resolved destination in a manner that is transparent to a sender of the packet and that does not require further authentication of the sender or encapsulation of the packet.

22. The system of claim 21, wherein the mobile router tunneling protocol engine is further capable of performing route optimization.

23. The system of claim 21, wherein the maintaining is based on load balancing analysis.

24. The system of claim 23, wherein the mobile router tunneling protocol engine is further capable of communicating with the corresponding gateway to determine if a load in the second network cluster exceeds a fixed threshold.

25. The system of claim 23, wherein the mobile router tunneling protocol engine is further capable of communicating with the corresponding gateway to determine if a load in the second network cluster exceeds a load in the first network cluster.

26. The system of claim 21, wherein the establishing is based on the distance between an origin of the received packet and the second network cluster.

27. The system of claim 26, wherein the distance is measured in terms of space coordinates.

28. The system of claim 26, wherein the distance is measured in terms of delays.

29. The system of claim 21, wherein the first network cluster runs a first service and the second network cluster runs a second service.

30. The system of claim 21, wherein the mobile router tunneling protocol includes the NEMO standardized protocol.

31. An originating gateway communicatively coupled to a first network cluster, comprising:

means for invoking a trigger by an application in the originating gateway when at least one predetermined circumstance occurs;

upon receipt of the trigger, means for maintaining a service location in a fixed network environment using a bi-directional tunnel to a second network cluster according to a mobile router tunneling protocol;

means for receiving a packet addressed in the first network cluster;

means for resolving a new destination in the second network cluster of the received packet based on the maintaining; and means for forwarding the packet to the resolved destination in a manner that is transparent to a sender of the packet and that does not require further authentication of the sender or encapsulation of the packet.

* * * * *